United States Patent
Campion et al.

(10) Patent No.: US 6,319,550 B1
(45) Date of Patent: Nov. 20, 2001

(54) METHOD AND APPARATUS FOR TREATING SILICA GRANULES USING POROUS GRAPHITE CRUCIBLE

(75) Inventors: Jean-Florent Campion, Bois Colombes; Jean-Philippe Francois, Thones; Christelle Lavallade, Courdimanche; Philippe Oskeritsian, Rueil Malmaison; Jean-Maxime Saugrain, Le Vesinet, all of (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/358,817

(22) Filed: Jul. 22, 1999

(30) Foreign Application Priority Data

Jul. 23, 1998 (FR) .................................................. 98 09409

(51) Int. Cl.$^7$ ....................................................... B05D 7/00
(52) U.S. Cl. ...................................... 427/215; 427/255.39
(58) Field of Search .................................. 427/212, 215, 427/255.39

(56) References Cited

U.S. PATENT DOCUMENTS

| | | | |
|---|---|---|---|
| 4,267,210 | * | 5/1981 | Yajima et al. ........................ 427/387 |
| 4,477,492 | * | 10/1984 | Bergna et al. ........................ 427/215 |
| 4,559,270 | * | 12/1985 | Sara ................................... 427/376.2 |
| 4,956,059 | | 9/1990 | Englisch et al. . |
| 5,116,679 | * | 5/1992 | Nadkarni et al. ...................... 427/215 |
| 5,413,844 | * | 5/1995 | Persello ................................ 427/215 |
| 5,652,017 | * | 7/1997 | Osaheni et al. ....................... 427/215 |
| 5,713,979 | * | 2/1998 | Nicholson et al. ..................... 65/424 |

FOREIGN PATENT DOCUMENTS

| | | |
|---|---|---|
| 38 36 934 A1 | 5/1990 | (DE) . |
| 0 578 553 A1 | 1/1994 | (EP) . |
| 04 325422 A | 11/1992 | (JP) . |

* cited by examiner

*Primary Examiner*—Bret Chen
(74) *Attorney, Agent, or Firm*—Sughrue, Mion, Zinn, Macpeak & Seas, PLLC

(57) ABSTRACT

Silica granules made up of mutually agglomerated silica soot particles are treated by placing the granules in a crucible inside a furnace which contains an inert gas mixed with a chlorine-containing compound and in which the temperature lies in the range 1000° C. to 1500° C. According to the invention, a crucible is used that is made of porous graphite firstly to increase the surface area of the crucible through which the chlorine-containing compound diffuses. This gives rise to faster exchange between the granules and the gas for given partial pressure of the chlorine-containing compound, thereby improving purification. Secondly, the difference between the chemical natures of the silicas and the crucible make the two materials inert relative to each other so that the granules do not adhere to the walls of the crucible, thereby making it possible to recover the granules without having to apply any mechanical operation that might contaminate them.

6 Claims, 1 Drawing Sheet

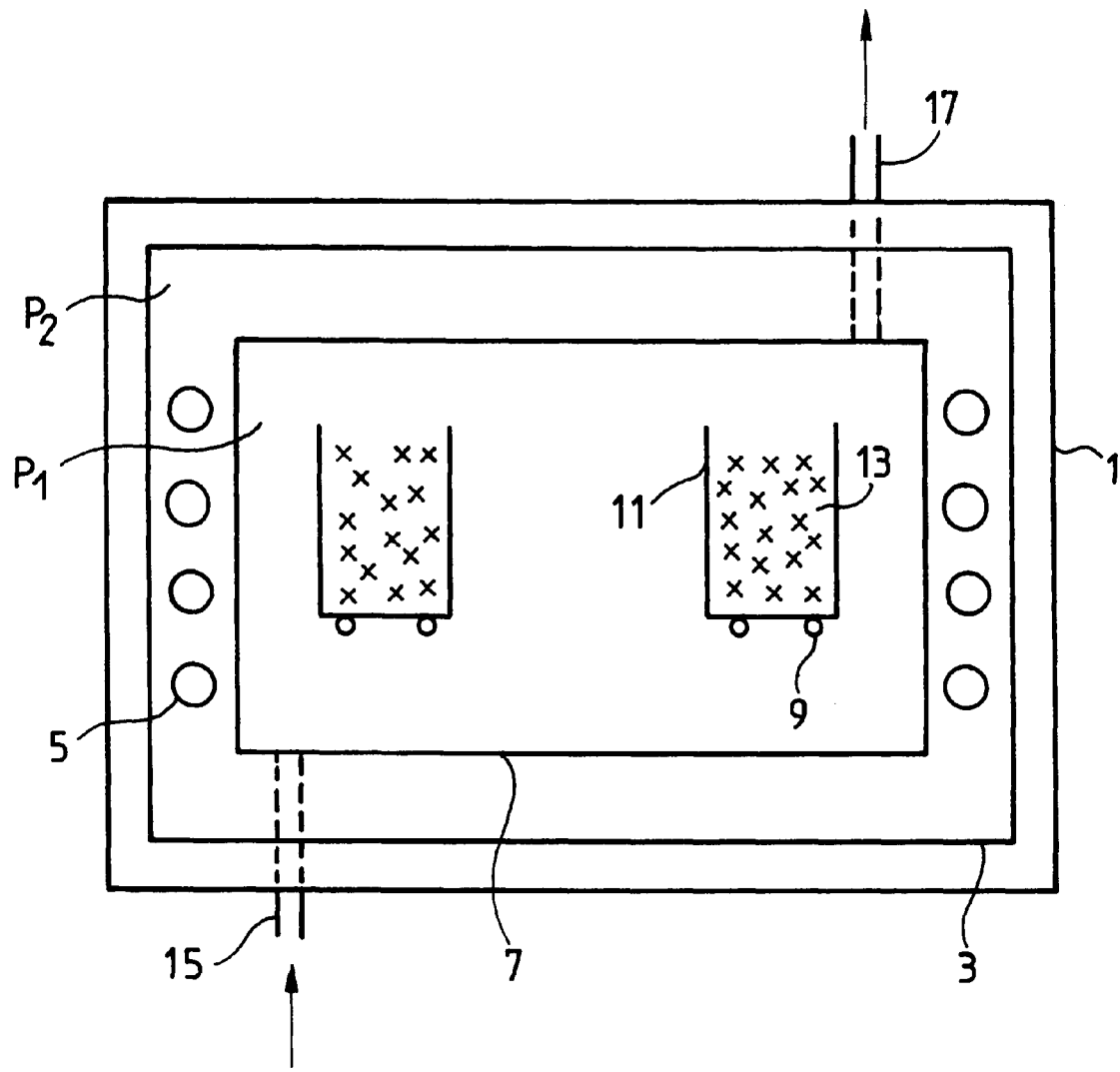

METHOD AND APPARATUS FOR TREATING SILICA GRANULES USING POROUS GRAPHITE CRUCIBLE

The invention relates to a method of treating granules of silica made up of mutually agglomerated silica soot particles, in which the granules are placed in a crucible within a furnace which contains an inert gas mixed with a chlorine-containing compound, and in which the temperature lies in the range 1000° C. to 1500° C.

BACKGROUND OF THE INVENTION

Silica granules are used in conventional manner to build up an optical fiber preform, in particular when it is desired to manufacture a monomode optical fiber. The build-up operation is performed, for example, on a bench that is fitted with a plasma torch which is fed with silica granules which are projected onto the preform until a desired diameter has been built up.

Granules obtained by agglomerating silica soot particles are of relatively low density and can contain impurities, coming from the soot particles themselves or from the reactor in which agglomeration took place.

It is known to purify and densify granules prior to using them in a bench for building up a preform. At present, the granules are placed in a dense crucible of opaque silica of very high purity so as to avoid any risk of the granules being contaminated by the crucible. Thereafter, the crucible is placed in a furnace containing an atmosphere of inert gas mixed with a chlorine-containing compound and having a temperature lying in the range 1000 degrees Celsius (° C.) and 1500° C. The chlorine-containing compound diffuses into the granules where it reacts with alkaline or metallic impurities, e.g. by forming gaseous chlorides which are then evacuated from the furnace. Under the action of temperature, the granules densify individually. The crucible is removed from the furnace after a length of treatment time that corresponds to the grains beginning to densify between one another, which densification should be minimized.

The known method of purifying and densifying silica granules is not without its drawbacks.

Firstly, the chlorine-containing compound comes into contact with the granules only via the open portion of the crucible, since the dense walls thereof are gasproof. As a general rule, the crucible is cylindrical in shape and has an open top end which forms a surface via which the chlorine-containing compound diffuses amongst the granules. At given partial pressure for the chlorine-containing compound in the gaseous atmosphere of the furnace, the time required for the chlorine-containing compound to diffuse amongst the granules over the full height of the crucible turns out to be quite long.

Also, although the pure silica crucible does not present any risk of contaminating the granules, it does have chemical affinity for granules made up of silica soot particles, and under the temperature conditions of the oven, that leads to the granules adhering to the walls of the crucible. In practical terms, adhesion makes it difficult to recover the granules in simple manner, and any mechanical action runs the risk of adding contamination.

OBJECT AND SUMMARY OF THE INVENTION

The object of the invention is to treat granules made up of mutually agglomerated silica soot particles by means of a high temperature heat treatment method under a chlorine-containing atmosphere, in which the crucible used does not suffer from the drawbacks due to limited diffusion of the chlorine-containing compound or to adhesion of the granules to its walls.

To this end, the invention provides a method of treating silica granules made up of mutually agglomerated silica soot particles, in which method the granules are placed in a crucible inside a furnace containing an inert gas mixed with a chlorine-containing compound and in which the temperature lies in the range 1000° C. to 1500° C., wherein a crucible is used that is made of porous graphite.

The use of a crucible made of porous graphite serves firstly to increase the surface area of the crucible through which the chlorine-containing compound diffuses. Exchange takes place more quickly between the granules and the gas for given partial pressure of the chlorine-containing compound, and as a result purification is improved.

In addition, the difference in chemical nature between the granules and the crucible makes the two materials inert relative to each other so that the granules do not adhere to the walls of the crucible.

It will be observed that the graphite crucible presents good resistance to abrasion so there is no risk of the granules becoming contaminated during operations of filling and emptying the crucible. Nevertheless, if necessary, it is possible to use a graphite-graphite composite crucible which presents higher resistance to abrasion than does a crucible made of ordinary graphite.

BRIEF DESCRIPTION OF THE DRAWING

Other characteristics and advantages of the invention will appear on reading the following description of an implementation as represented by a single FIGURE which is a diagram of apparatus for implementing the method of the invention.

MORE DETAILED DESCRIPTION

To manufacture granules by mutually agglomerating silica soot particles, a sol-gel method is used, for example, in which an aqueous suspension of soot is made in a stainless steel reactor, the suspension is gelled, the resulting gel is dried under microwaves, and the dry gel is fractioned into silica granules. Typically, granules are obtained having a size that lies in the range 10 microns ($\mu$m) to 1000 $\mu$m, and presenting an apparent density of about 0.5 grams per cubic centimeter (g/cm$^3$) to 0.6 g/cm$^3$.

High purity silica soot is agglomerated for the purpose of eliminating impurities as far upstream as possible in the method. However, preparing granules by the sol-gel method leads to contamination by metallic impurities that come from the stainless steel reactor.

To purify and densify previously-obtained granules, a furnace is used, e.g. a graphite furnace, which comprises (as shown in the sole FIGURE and going from the outside towards the inside): a metal outer enclosure 1; an intermediate enclosure 3 that is thermally insulating and made of graphite felt; and heater elements 5 disposed around an inner enclosure 7 that is made of graphite and that forms the inside space of the furnace. Cylindrical crucibles 11 filled with granules 13 are placed on sample carriers 9 inside the inner enclosure 7 of the furnace.

The heater elements 5 maintain the inner enclosure 7 of the furnace at a temperature lying in the range 1000° C. to 1500° C. A gaseous mixture comprising, by volume, about 50% helium (He) and 50% chlorine ($Cl_2$) is injected into the inner enclosure 7 via an inlet valve 15 that is fixed to the metal enclosure 1. The gaseous atmosphere inside the inner enclosure 7 can also be made from a mixture of helium and of hydrochloric acid (HCl).

According to the invention, the crucibles used for purifying and densifying the granules in the furnace are made of porous graphite. As mentioned above, the use of such porous graphite crucibles serves firstly to increase the area of the crucible through which chlorine can diffuse, thereby giving rise to faster exchange between the granules and the gas, for given partial pressure of chlorine.

Secondly, the difference in chemical nature between the granules and the graphite crucible makes the two materials inert relative to each other so that the granules do not adhere to the walls of the crucible. This facilitates recovering the granules at the end of the purification and densification treatment.

The gas mixture is preferably caused to circulate at a constant rate through the furnace by extraction that is performed simultaneously with the injection and that takes place via an extractor valve 17 that is fixed to the metal enclosure 1. This serves to eliminate the impurity chlorides as the granules are being purified.

It should be observed that the inner enclosure 7 is made of graphite so as to take advantage of the thermal behavior of this material. However, the porosity of graphite constitutes a drawback under these circumstances since it allows chlorine to diffuse out from the inner enclosure 7 of the furnace. To confine the gas mixture inside the enclosure, provision is made to inject helium between the metal enclosure 7 and the insulating intermediate enclosure 3 at a pressure P2 that is slightly greater than the pressure P1 of the mixture of helium and chlorine gas.

Comparative tests between a dense crucible of opaque silica and a crucible of porous graphite have shown that chlorine consumption is divided by three when obtaining the same degree of granule purification corresponding to an impurity concentration of less than 0.1 parts per million (ppm) for transition metals such as iron, nickel, chromium, or molybdenum.

In an advantage of the invention, the gaseous atmosphere inside the internal enclosure of the furnace is made by mixing helium with silicon tetrafluoride $SiF_4$, as a replacement for or in addition to the chlorine-containing compound $Cl_2$ or HCl. As with chlorine or hydrochloric acid, the use of cylindrical crucibles made of porous graphite makes it possible to increase the surface area of the crucible through which the fluorine-containing compound diffuses. This accelerates exchange between the granules and the gas for given partial pressure of silicon tetrafluoride. This ensures that the granules are doped with fluorine in more uniform manner.

What is claimed is:

1. A method of treating silica granules made up of agglomerated silica soot particles, in which method the granules are placed in a crucible inside a furnace containing an inert gas mixed with a chlorine-containing compound and in which the temperature lies in the range 1000° C. to 1500° C., wherein the crucible is made of porous graphite.

2. A method according to claim 1, in which the crucible is made of graphite-graphite composite.

3. A method according to claim 1, in which the inert gas is helium and the chlorine-containing compound is chlorine or hydrochloric acid.

4. A method according to claim 1, in which the chlorine-containing compound is mixed with silicon tetrafluoride.

5. A method according to claim 1, in which the inert gas and the chlorine-containing compound are circulated at a constant rate through the furnace by simultaneous injection and extraction.

6. A method of treating silica granules made up of agglomerated silica soot particles, in which method the granules are placed in a crucible inside a furnace containing an inert gas mixed with silicon tetrafluoride and in which the temperature lies in the range 1000° C. to 1500° C., wherein the crucible is made of porous graphite.

* * * * *